United States Patent [19]

Lamb

[11] 4,130,532
[45] Dec. 19, 1978

[54] POLYESTER PLASTICIZERS
[75] Inventor: Frank Lamb, Oldham, England
[73] Assignee: Ciba-Geigy AG, Basel, Switzerland
[21] Appl. No.: 774,727
[22] Filed: Mar. 7, 1977

Related U.S. Application Data

[63] Continuation of Ser. No. 603,999, Aug. 12, 1975, abandoned.

[30] Foreign Application Priority Data

Aug. 21, 1974 [GB] United Kingdom ............... 36726/74

[51] Int. Cl.$^2$ ..................... C07C 69/34; C08K 5/11; C08K 5/12; C08L 27/06
[52] U.S. Cl. ............................. 260/31.6; 260/404.8; 560/90; 560/185
[58] Field of Search ............... 260/475 P, 31.6, 404.8; 560/90

[56] References Cited

U.S. PATENT DOCUMENTS

| 2,914,556 | 11/1959 | Hostettler et al. | 260/31.6 |
|---|---|---|---|
| 2,977,385 | 3/1961 | Fowler et al. | 260/475 P |
| 3,169,945 | 2/1965 | Hostettler et al. | 260/475 P |
| 3,786,011 | 1/1974 | Price et al. | 260/31.6 |

FOREIGN PATENT DOCUMENTS

| 732913 | 6/1955 | United Kingdom | 260/31.6 |
|---|---|---|---|
| 734115 | 7/1955 | United Kingdom | 260/31.6 |
| 859642 | 1/1961 | United Kingdom | 260/31.6 |
| 1076877 | 7/1967 | United Kingdom. | |
| 1137882 | 12/1968 | United Kingdom | 260/31.6 |

OTHER PUBLICATIONS

Koroly et al., Ind. & Eng. Chemistry, vol. 45, No. 5, May 1953, pp. 1060–1063.

*Primary Examiner*—Allan Lieberman
*Attorney, Agent, or Firm*—Luther A. R. Hall

[57] ABSTRACT

Caprolactone modified polyesters derived from an aliphatic dihydroxy compound and a mixture of aliphatic dicarboxylic acids and a proportion above 10 mol % of the total acids used, of an aromatic dicarboxylic acid and terminated with an alcohol or monocarboxylic acid such that the molecular weight ranges from 500 to 1400 are good plasticizers for polymers, especially polyvinyl chloride.

12 Claims, No Drawings

POLYESTER PLASTICIZERS

This is a continuation of application Ser. No. 603,999, filed on Aug. 12, 1975, now abandoned.

The present invention relates to novel plasticisers for thermoplastic polymers such as polyvinyl chloride, and more particularly to plasticisers derived from polyesters incorporating ε-capro-lactone as co-reactant.

In British Patent Specification No. 1,137,882 there is claimed a process for the manufacture of polyesters which comprises reacting a mixture of the following components:

(a) between 10 mole % and 65 mole % of ε-caprolactone, (b) between 45 mole % and 17.5 mole % of an aliphatic dihydroxy compound, or of a mixture of two or more such compounds, and (c) between 45 mole % and 17.5 mole % of an aliphatic dicarboxylic acid, or of a mixture of two or more such acids, or of a mixture of one or more such acids with a proportion not exceeding 10 mole % of the total acids used of an aromatic dicarboxylic acid, the proportions of the components (a), (b) and (c) of the reaction mixture being further selected, within the limits defined above, according to the nature of the individual compounds constituting components (b) and (c) in such a way that the overall ratio of carbon to oxygen atoms in the polyester obtained, excluding from consideration the oxygen atoms present in the terminal groups, is at least 4.5:2, provided that when component (b) consists of a single aliphatic α,ω-dihydroxy compound and component (c) consists of a single aliphatic α,ω-dicarboxylic acid, at least one of components (b) and (c) is a compound in which the main chain carbon atoms carry one or more substituent groups which are lower alkyl groups having from 1 to 4 carbon atoms.

There may also be included in the reaction mixture from which the polyester is obtained, in addition to components (a), (b) and (c) already defined, a monohydroxy compound or a monocarboxylic acid and the preferred ratio of monohydroxy compound to dihydroxy compound, or monocarboxylic acid to dicarboxylic acid respectively is between 5 mole % and 50 mole %. The polyesters thus produced are stated to be useful as plasticisers for vinyl chloride resins.

British Patent Specification No. 859,642 describes polyesters derived from lactones with at least one terminal hydroxyl group as being useful as plasticisers for vinyl halide and other resins. The polymerisation is initiated by such compounds as primary alcohols, diols containing from 2 to 10 carbon atoms and dicarboxylic acids such as phthalic acid, isophthalic acid and terephthalic acid. It is also stated that when the polyesters are to be used as plasticisers, the molecular weight may range between about 1500 and about 9000 and that optimum plasticising characteristics are obtained with polyesters having molecular weights between about 2000 and about 4000.

We have found surprisingly that caprolactone modified polyesters derived from an aliphatic dihydroxy compound and a mixture of aliphatic dicarboxylic acids and a proportion above 10 mole % of the total acids used, of an aromatic dicarboxylic acid, and terminated with an alcohol or monocarboxylic acid such that the molecular weight ranges from 500 to 1400 are more efficient, have lower clear points, and the combination of viscosity and clear point is better for use as PVC plasticisers than comparable products described in British Pat. No. 859,642, i.e. when the products described in British Pat. No. 859,642 have comparable viscosity with those of the present invention, they have higher clear points, and when the products described in British Pat. No. 859,642 have comparable clear points, they have higher viscosities and are usually solid.

According to the present invention there is provided a polyester having the formula $$M(P)_a(D)_b(L)_cM \qquad \text{I}$$

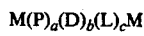

in which M is the residue of one or more aliphatic monocarboxylic acids or one or more saturated straight or branched chain monohydric alcohols containing from 4 to 12 carbon atoms, P is the residue of one or more saturated straight or branched chain aliphatic diols containing from 2 to 4 carbon atoms, D is the residue of a mixture of one or more aliphatic dicarboxylic acids containing from 4 to 6 carbon atoms and a proportion above 10 mole % of the total acids used, of one or more aromatic dicarboxylic acids containing from 8 to 16 carbon atoms, L is the residue of 6-hydroxy caproic acid, each of the residues being jointed together by ester linkages, residues P, D and L being distributed at random throughout the molecule, a, b and c each having a value greater than 0, the amount of residue of hydroxy acid being from 10 mole % to 90 mole % based on the total number of moles of reactants and the molar ratios of the remaining reactants being chosen so that the average molecular weight of the product is from 500 to 1400. Liquid polyesters are preferred since on the commercial scale they are much easier to handle and process than solid polyesters.

The residue of 6-hydroxy caproic acid is preferably derived from epsilon caprolactone but it could be derived from 6-hydroxy caproic acid itself in the preparation of the compounds of formula I.

When M is the residue of a monocarboxylic acid, the acid preferably contains from 8 to 10 carbon atoms. The acid may be, for example, caproic, caprylic, 2-ethylhexanoic, isooctanoic, capric or lauric acid. When M is the residue of a monohydric alcohol, the alcohol preferably contains from 8 to 11 carbon atoms. The alcohol may be for example, n-butanol isobutyl alcohol, n-hexanol, isooctyl alcohol, nonanol, isodecyl or dodecyl alcohol. Particularly preferred alcohols are isooctyl alcohol (a commercially available mixture containing branched chain primary alcohols with eight carbon atoms), "Aphanol" 79 (which consists mainly of straight-and branched-chain primary alcohols containing 7–9 carbon atoms), 2-ethylhexanol, isodecyl alcohol, Alfol 810 (a commercial product consisting mainly of n-octanol and n-decanol), the mixtures of predominantly straight chain aliphatic alcohols containing 7 to 9 carbon atoms sold under the Trade Mark "Linevol" 79, and the mixture of predominantly straight chain aliphatic alcohols containing 9 to 11 carbon atoms sold under the Trade Mark "Linevol" 911.

The diol corresponding to residue P may be, for example, ethylene glycol; diethylene glycol; propane-1,2-diol; butane-1,3-diol or butane-1,4-diol. The chain may, if desired, be interrupted by an oxygen atom as in diethylene glycol.

The aliphatic dicarboxylic acid or anhydride corresponding to residue D may be for example succinic acid, glutaric acid or adipic acid or the anhydrides. A commercially available mixture containing 27.4% succinic acid, 42.4% glutaric acid and 30.2% adipic acid is particularly useful.

The aromatic dicarboxylic acid or anhydride corresponding to residue D may, if desired, be substituted with from 1 to 4 alkyl groups containing from 1 to 4 carbon atoms.

The dicarboxylic acid or anhydride preferably contains 8 carbon atoms and may be isophthalic acid, but ophthalic acid or phthalic anhydride is particularly preferred.

The amount of ε-caprolactone is 10 to 90 mole %, preferably 20 to 70 mole %, but most preferably 30 to 50 mole %.

The present invention also provides a process for the manufacture of polyesters of formula I which comprises reacting a mixture of the following components a) from 10 to 90 mole % of epsilon caprolactone or the corresponding hydroxy acid, b) a hydroxylic component which comprises one or more saturated straight or branched chain aliphatic diols containing from 2 to 4 carbon atoms c) an acidic component which comprises a mixture of one or more aliphatic dicarboxylic acids containing from 4 to 6 carbon atoms and a proportion above 10 mole % of the total acids used of one or more aromatic dicarboxylic acids containing from 8 to 16 carbon atoms and d) one or more aliphatic monocarboxylic acids containing from 4 to 12 carbon atoms, or one or more saturated straight or branched chain monohydric alcohols containing from 4 to 12 carbon atoms such that the hydroxylic components are used in stoichiometric amounts or up to 20% excess over the stoichiometric amounts related to the acidic components. The amount of lactone and the ratios of the remaining reactants are chosen so that the average molecular weight of the product is from 500 to 1400.

The process for the manufacture of the polyesters of formula I may be carried out by conventional methods for the manufacture of polyesters prepared solely from dihydroxy compounds and dicarboxylic acids. For example the reaction mixture may conveniently be heated from 100° C. to 250° C. under conditions such that the water resulting from the condensation reaction is removed as it is formed, for example by passing a current of inert gas through the heated reaction mixture or by conducting the reaction in the presence of a suitable inert solvent such as xylene, with which the water may be removed by distillation as an azeotrope. Preferably the reaction is continued until the proportion of carboxylic acid end groups in the resulting polyester corresponds to an acid value of not more than 10 milligrams and especially not more than 5 milligrams potassium hydroxide per gram.

If desired a catalyst commonly used in polyester formation may be added to the reaction mixture for example strong acids such as sulphuric acid, phosphoric acid, p-toluene sulphonic acid, Lewis acids such as stannic acid, zinc chloride, aluminum chloride and metal salts and metal derivatives such as metal alkoxides for example tetrabutyl titanate, zinc adipate, antimony oxide and organo-tin compounds especially dibutyl tin oxide. The amount of catalyst used may be from 0.001% to 5% by weight based on the total weight of the reaction mixture. If desired up to 1% by weight of activated carbon based on the total weight of the reaction mixture may be added either to the reaction mixture or just before the filtration stage to preserve the colour of the product.

The polyesters of the present invention which may be used in amounts up to 60% by weight of the plasticised composition are efficient, easily processed plasticisers with good extraction resistance. They show an improvement in permanence in PVC without loss of efficiency when compared with conventional non-polymeric plasticisers. In fact, the polyesters of the present invention show a remarkable combination of properties not present in conventional non-migratory plasticisers: not only do they possess resistance to extraction and migration but they overcome the major defect of plasticisers of this type since they can be readily processed at temperatures commonly used for monomeric plasticisers.

A further major practical advantage of these novel plasticisers is their much lower viscosities, compared with conventional non-migratory polyester plasticisers. This leads to much easier handling, more rapid dispersion of mixtures and easier cleaning of equipment.

The polyesters of the present invention may be incorporated into thermoplastic polymers such as polyvinyl chloride or its copolymers by conventional methods. If desired other conventional additives may be present in the thermoplastic composition such as heat and light stabilisers, antioxidants, fillers, pigments, lubricants, processing aids, and other plasticisers.

Examples of heat and light stabilisers are as follows:

(1) Salts of inorganic or organic acids containing metals such as aluminium, barium, bismuth, calcium, cadmium, potassium, lithium, magnesium, sodium, lead, antimony, tin, strontium or zinc or any metal which is capable of exerting a stabilising effect on PVC in salt form. The salts may be simple or complex.

Examples of inorganic salts are basic lead carbonate and tribasic lead sulphate.

Organic acids which may be used are:

(a) Aliphatic carboxylic acids, straight or branched chain unsaturated or saturated, and optionally containing hydroxyl substituents or oxygen in epoxy groups. Examples are zinc 2-ethylhexanoate, barium laurate and stannous octanoate.

(b) Aromatic mono- or di-carboxylic acids containing any type of substitution in the aromatic groups and any type of alkyl/aryl configuration. Examples are cadmium p-tertiary butyl benzoate, calcium benzoate or lead salicylate.

(c) As acidic materials, phenols capable of forming stable compounds (phenates) with metals whether in a suitable solution or not. An example of such a compound is barium nonyl phenate.

(2) Organo-metallic compounds of any of the following metals, aluminium, barium, bismuth, calcium, cadmium, potassium lithium, magnesium, sodium, lead, antimony, zinc, tin or strontium.

Examples of such compounds are dialkyl tin mercaptides and dialkyl tin carboxylates.

(3) Organic compounds of any description which prevent degradation of PVC.

Among these are α-phenyl indole or esters of amino crotonic acid.

All these compounds may be used alone or as mixtures with each other either as solids or as solutions in any suitable solvent not necessarily being a stabiliser. Combinations which may be used are of calcium and zinc carboxylates or of a barium phenate with the cadmium salt of a branched chain fatty acid or of barium, cadmium and zinc carboxylates.

There may be used with the foregoing stabilisers, materials which enhance the effectiveness of the stabilisers but which are not stabilisers for PVC when used alone. These are referred to as co-stabilisers and include (a) Epoxidised oils and esters such as epoxidised soya bean oil or epoxidised octyl oleate (b) Esters of phosphorous acid which may be trialkyl, triaryl or alkyl-aryl. For example triphenyl phosphite, tris (nonyl phenyl) phosphite or diphenyl isodecylphosphite.

(c) Aliphatic hydrophilic compounds such as pentaerythritol neopentyl glycol, sorbitol or partial esters of glycerol.

(d) Phenolic compounds such as 2,6-di-tert-butyl-4-methylphenol, or 2,2-bis-(4-hydroxyphenyl)propane.

These co-stabilisers can be used singly or together with the main stabiliser in any proportions and combinations. They may be applied in their natural state, alone or in mixtures of stabilisers, or in solvent solutions, alone or in admixture with the stabilisers, using suitable solvents which are not necessarily PVC stabilisers.

They may also be used in admixture with lubricants such as polyethylene waxes, ester waxes, stearic acid, calcium stearate, lead stearate, fillers such as calcium carbonate ground or precipitated or china clays.

They may also be used with materials which absorb ultra-violet light, making the PVC compound more stable to light exposure, for example benzophenones or benzotriazoles.

They may also be used in admixture with other known plasticisers which may be:

(a) Flame retardant such as triarylphosphates, alkyl diaryl phosphates.

(b) Phthalate esters.

(c) Low temperature plasticisers such as adipate, sebacate, and azelate esters.

(d) Conventional polyester plasticisers such as poly(1,3 butylene glycol adipate)end-stopped with a $C_8$ alcohol or other typical members of this class.

(e) Aryl esters of alkane sulphonic acids.

(f) Extenders comprising halogenated paraffins or aromatic hydrocarbons.

The following Examples further illustrate the present invention.

The acid value is determined by dissolving a sample of the polyester in neutralised ethanol (or an ethanol-toluene mixture) and titrating with N/10 sodium hydroxide solution using phenolphthalein as indicator. The result is expressed in mg KOH per g.

The hydroxyl value is measured by acetylating the polyester with excess acetic anhydride in ethyl acetate with p-toluene sulphonic acid as catalyst followed by hydrolysis of unreacted acetic anhydride. This reaction mixture, and an aliquot of the acetylation reagent are titrated with standard alkali. The difference in the titres gives a measure of the acetic anhydride which has reacted with the hydroxyl groups and from this figure the hydroxyl value (in mg KOH per g) can be calculated.

The viscosity is measured using an Ubbelohde suspended level viscometer (ASTM D445-IP71).

EXAMPLES 1 to 6

A 2 liter four necked round bottom flask was fitted with a stirrer in a ground glass stirrer gland, a 0°–250° C. contact thermometer in a thermometer pocket, and a nitrogen inlet. The flask was also fitted with a vacuum jacketed Vigreux column (15.2 cm (6 inch) effective length), surmounted by a water separator provided with a water-cooled condenser. The amounts of the reactants specified in Table 1 were charged to the flask together with 10–15% by weight on the theoretical yield of polyester of xylene and 0.1% by weight based on the theoretical yield of polyester of dibutyl tin oxide. Activated carbon in an amount 1% by weight based on the theoretical yield of ester was added to the reaction mixture in order to preserve the colour of the product.

The reactants were then heated up to approximately 200° C. over 8 hours with stirring, and this temperature maintained for a further 10 to 20 hours. A slow stream of nitrogen was passed into the reaction flask throughout the reaction. Water formed in the reaction was separated from the xylene in the water separator. When the acid value of the reaction mixture had reached the value given in Table 1, the solvent was removed by heating the reaction mass under reduced pressure. The mixture was finally vacuum stripped at 200° C. for one hour at 20 millimeters mercury pressure. The product was filtered in a pressure filter under nitrogen and was obtained as a clear liquid. The yields and properties of these polyesters are given in Table 1. The "mixed dicarboxylic acids" referred to in Table 1 is a commercially available product with the approximate composition:

succinic acid; 27.4%
glutaric acid; 42.4%
adipic acid; 30.2%

Table 1

| Example | dicarboxylic acids | Phthalic anhyd. | Ethylene glycol | Isooctyl alcohol except where otherwise indicated | ε-caprolactone | Yield (g) | Acid value (mg KOH/g) | Hydroxyl value (mg KOH/g) |
|---|---|---|---|---|---|---|---|---|
| 1 | 90.7 [14.0] | 49.3 [7.00] | 44.0 [14.9] | 92.3 [14.9] | 267 [49.2] | 461 | 4.3 | 4.0 |
| 2 | 45.3 [7.00] | 98.7 [14.0] | 44.0 [14.9] | 92.3 [14.9] | 267 [49.2] | 431 | 0.9 | 1.0 |
| 3 | 18.1 [21.0] | 98.6 [10.5] | 111 [28.3] | 83.2 [10.1] | 217 [30.0] | 561 | 5.8 | <1.0 |
| 4 | 90.6 [8.62] | 197 [17.2] | 65.5 [13.7] | 303 [30.1] isooctanoic acid | 267 [30.3] | 792 | 4.2 | 9.0 |
| 5 | 91.1 [7.43] | 49.3 [3.66] | 125 [22.3] | 219 [16.6] isooctanoic acid | 514 [50.0] | 852 | 1.4 | 2.6 |
| 6 | 44.9 [4.44] | 99.2 [9.01] | 107 [23.2] | 146 [13.4] | 424 [50.0] | 703 | 0.85 | 3.7 |

Comparative Examples A and B

These polyesters were prepared from the reactants specified in Table 2 by a similar method to that described in Examples 1 to 6 but in Example B tetra-butyl titanate was used as catalyst. The yields and properties are given in Table 2.

Comparative Examples C and D

The polyester of Comparative Example C was prepared in a similar manner to that described in British Pat. No. 859,642.

The polyester of Comparative Example D was prepared by acetylating 400 grams of the polyester of Example C with 116 grams acetic anhydride for 5 hours at 100° C. Excess acetic anhydride and acetic acid were then removed under vacuum. The yields and properties are given in Table 2.

Comparative Examples E and F

The polyester of Comparative Example E was prepared in a similar manner to that described in British Patent Specification 859,642 in which phthalic anhydride, epsilon-caprolactone and ethylene glycol in the amounts specified in Table 2 together with 0.1% by weight based on the theoretical yield of polyester of tetra-butyl titanate, were heated to 160° C. under nitrogen until the water of condensation ceased to distil off.

The yields and properties of these polyesters are given in Table 2.

EXAMPLES 7 to 12

The compositions of Examples 7 to 12 were obtained by incorporating 35 parts of the polyesters of Examples 1 to 6 respectively into 65 parts of polyvinyl chloride (Breon S 125/12) 4 parts of white lead paste and 1 part calcium stearate. The premix was compounded on a two roll mill at 165° C. for 15 minutes, and compression moulded at 180° C. for 6 minutes. The physical properties are given in Table 3.

Comparative Examples G to L

The compositions of Comparative Examples G to L were obtained by incorporating 35 parts of the polyesters of Comparative Examples A to F respectively into 65 parts of polyvinyl chloride (Breon S 125/12), 4 parts of white lead paste and 1 part calcium stearate. The premix was compounded on a two roll mill at 165° C. for 15 minutes, and compression moulded at 180° C. for 6 minutes. The physical properties are given in Table 3.

The physical properties of the compositions of Examples 7 to 12 and Comparative Examples G to L were Table 2

| COMPARA-TIVE EXAMPLE | REACTANTS (g) [mol % based on the polyester] | | | ε-capro-lactone | Yield (g) | Acid value (mgKOH/g) | Hydroxy value (mgKOH/g) | Viscosity (cs at 25° C) | Mol. Wt. (vapour pressure osmometer) |
|---|---|---|---|---|---|---|---|---|---|
| | Dicarboxylic Acid | Diol | Alcohol or Monocarboxylic acid | | | | | | |
| A | sebacic 412 [30.4] | 1,6-hexanediol 278 [35.6] | 2-ethylhexanoic acid 38.3 [4.04] | 225 [29.9] | 817 | 0.53 | 25 | SOLID mp 42° C | 2250 |
| B | sebacic 412 [33.1] | 1,6-hexanediol 234 [32.6] | 7-ethyl-2-methyl-undecanol-4 58.8 [4.55] | 205 [29.8] | 822 | negligible | 9.0 | SOLID mp 46-9° C | 2410 |
| C | adipic 365 [31.7] | ethylene glycol 179 [36.5] | — | 285 [31.7] | 729 | 0.65 | 38 | 14.260 | 2898 (calculated) |
| D | 400 g polyester of Example C acetylated with 116 g acetic anhydride (= 4 × theoretical amount) | | | — | 378 | 1.5 | 2.7 | 52,920 | 1750 |
| E | phthalic anhydride 592 [31.2] | ethylene glycol 298 [37.5] | — | 456 [31.2] | 1184 | 0.35 | 52 | too high to measure | 2141 (calculated from acid value and hydroxyl value) |
| F | 595 g polyester E acetylated with 237 g acetic anhydride (= 4 × theoretical amount) | | | — | 619 | 0.9 | −1.0 | >400,000 | 1751 |

The reactants were then kept at the same temperature for another 24 hours and then subjected to a vacuum of 20 millimeters for 3.5 hours still at the same temperature. This polyester is outside the scope of the present invention because it is not end-stopped.

The polyester of Comparative Example F was prepared by heating the polyester prepared in Example E with acetic anhydride in the amounts specified in Table 2 for 5 hours at 100° C., followed by vacuum stripping for 2 hours at 200° C. and 1.0 millimeter mercury pressure. This polyester is outside the scope of the present invention because it is end-stopped by acetyl groups whereas the polyesters of the present invention are end-stopped by alcohols or acids containing from 4 to 12 carbon atoms.

determined by the following methods:

(a) International Rubber Hardness Degrees (IRHD) tested to BS 903 part A7 at 23° C. This indicates the efficiency.

(b) Clear Point — the temperature at which a few particles of PVC heated in an excess of plasticiser and observed at a magnification of × 100 with a microscope are no longer discernible. The test indicates the relative processability of formulations containing differing plasticisers. In general the lower the clear point the easier the processing of the formulation. The products of this invention which are efficient and have low clear points are preferably liquid polyesters of relatively low viscosity and are easily handled and incorporated into PVC in contrast to similar compounds described in British Pat. No. 859,642 which are either solid or of high viscosity.

Table 3

| Example | Amount aromatic dicarboxylic acid (mol %)* | Viscosity (at 25° C) CS | Mol.Wt. (vapour pressure osmometer) | TRHD (54 parts of plasticiser per 100 parts of resin) | Clear Point (° C) |
|---|---|---|---|---|---|
| 7 | 33.3 | 1645 | 1000 | 82 | 137 |
| 8 | 66.7 | 3246 | 1125 | 84 | 138 |
| 9 | 33.3 | 6486 | 1300 | 89 | 152 |
| 10 | 66.5 | 441.0 | 750 | 82 | 122 |
| 11 | 13.2 | 1052 | 1000 | 76 | 135 |
| 12 | 33.5 | 2546 | 1400 | 83 | 140 |
| G | 0 | SOLID m.p. 42° C | 2250 | 80 | 138 |
| H | 0 | SOLID m.p. 46–9° C | 2410 | 81 | 148 |
| I | 0 | 14,260 | 2898 | 91 | 177 |
| J | 0 | 52,920 | 1750 | 90 | 173 |
| K | 100 | too high to measure | 2141 | could not be milled with PVC | >200 |
| L | 77.2 | >400,000 | 1751 | 100 | 170 |

*Based on total acids used.

EXAMPLES 13 to 16

By following a similar procedure to that described for Examples 1 to 6 but using the reactants specified in Table IV in the molar proportions specified in any of Examples 1 to 4, compounds of formula I are produced.

EXAMPLES 17 to 20

By following a similar procedure to that described for Examples 1 to 6 but using the reactants specified in Table IV in the molar proportions specified in Example 5 or 6, compounds of formula I are produced.

TABLE 4

| Example No. | Residue of 6-hydroxy caproic acid | Monocarboxylic acid corresponding to residue M | Monohydric alcohol corresponding to residue M | Diol corresponding to residue P | Aliphatic dicarboxylic acid corresponding to residue D | Aromatic dicarboxy acid corresponding to residue D |
|---|---|---|---|---|---|---|
| 13 | ← caprolactone | — | isobutanol | propane-1,2-diol | glutaric | phthalic |
| 14 | ← caprolactone | — | Linevol-79 | butane-1,3-diol | mixed di-carboxylic acids* | isophthalic |
| 15 | ← caprolactone | — | n-hexanol | propane-1,2-diol | adipic | phthalic |
| 16 | ← caprolactone | — | isodecyl alcohol | ethylene glycol | glutaric | phthalic |
| 17 | ← caprolactone | caproic | — | butane-1,3-diol | mixed di-carboxylic acids* | isophthalic |
| 18 | ← caprolactone | isooctanoic | — | propane-1,2-diol | glutaric | phthalic |
| 19 | ← caprolactone | capric | — | butane-1,3-diol | adipic | phthalic |
| 20 | ← caprolactone | caprylic | — | di-ethylene glycol | glutaric | isophthalic |

*as defined in Examples 1 to 6

I claim:
1. A polyester having the formula

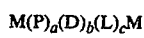

$$M(P)_a(D)_b(L)_cM \qquad I$$

in which M is the residue of one or more aliphatic monocarboxylic acids containing from 4 to 12 carbon atoms or one or more saturated straight or branched chain monohydric alcohols containing from 4 to 12 carbon atoms, P is the residue of one or more saturated straight or branched chain aliphatic diols containing from 2 to 4 carbon atoms, D is the residue of a mixture of one or more aliphatic dicarboxylic acids containing from 4 to 6 carbon atoms and a proportion above 10 mole % of the total acids used, of one or more aromatic dicarboxylic acids or anhydrides selected from the group consisting of o-phthalic acid, phthalic anhydride and isophthalic acid, L is the residue of 6-hydroxy caproic acid, each of the residues being joined together by ester linkage, residues P, D and L being distributed at random throughout the molecule, a, b and c each having a value greater than 0, the amount of residue of hydroxy acid being from 10 mole % to 90 mole % based on the total number of moles of reactants and the molar ratios of the remaining reactants being chosen so that the average molecular weight of the product is from 500 to 1400, which is prepared by reacting in one-step a mixture of the following components (a) from 10 to 90 mole % of epsilon caprolactone or the corresponding hydroxy acid, (b) a hydroxylic component which comprises one or more saturated straight or branched chain aliphatic diols containing from 2 to 4 carbon atoms, (c) an acidic component which comprises a mixture of one or more aliphatic dicarboxylic acids containing from 4 to 6 carbon atoms and a proportion above 10 mole % of the total acids used of one or more aromatic dicarboxylic acids or anhydrides selected from the group consisting of o-phthalic acid, phthalic anhydride and isophthalic acid, and, (d) one or more aliphatic monocarboxylic acids containing from 4 to 12 carbon atoms or one or more saturated straight or branched chain monohydric alcohols containing from 4 to 12 carbon atoms such that the hydroxylic components are used in stoichiometric amounts or up to 20% excess over the stoichiometric amounts related to the acidic components.

2. A polyester as claimed in claim 1 in which the residue of 6-hydroxy-caproic acid is derived from epsilon caprolactone.

3. A polyester as claimed in claim 1 in which M is the residue of a monocarboxylic acid containing from 8 to 10 carbon atoms.

4. A polyester as claimed in claim 3 in which M is the residue of isooctanoic acid.

5. A polyester as claimed in claim 1 in which M is the residue of a monohydric alcohol containing from 8 to 11 carbon atoms.

6. A polyester as claimed in claim 5 in which M is the residue of isooctyl alcohol.

7. A polyester as claimed in claim 1 in which the diol corresponding to residue P is ethylene glycol.

8. A polyester as claimed in claim 1 in which the residue of the aliphatic dicarboxylic acid or anhydride corresponding to residue D is derived from succinic, glutaric or adipic acid or anhydride.

9. A polyester as claimed in claim 1 in which the residue of the aromatic dicarboxylic acid or anhydride corresponding to residue D is derived from o-phthalic acid or phthalic anhydride.

10. A polyester as claimed in claim 1 in which the amount of epsilon caprolactone is from 20 to 70 mole % based on the total number of moles of reactants.

11. A composition comprising (a) a thermoplastic polymer selected from the group consisting of poly(vinyl chloride) and poly(vinyl chloride) copolymers and (b) a plasticizing amount up to 60% by weight of the plasticized composition of a polyester according to claim 1.

12. A composition according to claim 11 containing from 35 to 60% by weight of polyester plasticizer.

* * * * *